United States Patent [19]

England et al.

[11] 4,109,310

[45] Aug. 22, 1978

[54] VARIABLE FIELD LENGTH ADDRESSING SYSTEM HAVING DATA BYTE INTERCHANGE

[75] Inventors: Alfred W. England, Los Angeles; Louis M. Krasny, Beverly Hills; Edward F. Narey, Carson, all of Calif.

[73] Assignee: Xerox Corporation, Stamford, Conn.

[21] Appl. No.: 385,763

[22] Filed: Aug. 6, 1973

[51] Int. Cl.² ........................ G06F 9/12; G06F 13/00
[52] U.S. Cl. .................................................. 364/200
[58] Field of Search ......................... 340/172.5; 444/1; 364/200 MS File, 900 MS File

[56] References Cited

U.S. PATENT DOCUMENTS

| | | | |
|---|---|---|---|
| 3,077,580 | 2/1963 | Underwood | 340/172.5 |
| 3,166,668 | 1/1965 | Marsh | 340/172.5 |
| 3,238,508 | 3/1966 | Kelley | 340/172.5 |
| 3,331,056 | 7/1967 | Lethin et al. | 364/200 |
| 3,496,550 | 2/1970 | Schachner | 340/172.5 |
| 3,735,355 | 5/1973 | Balogh, Jr. | 340/172.5 |
| 3,739,352 | 6/1973 | Packard | 340/172.5 |

*Primary Examiner*—Melvin B. Chapnick

*Attorney, Agent, or Firm*—James J. Ralabate; Sheldon F. Raizes; Ronald L. Taylor

[57] ABSTRACT

A microprogrammable computer system including a central processing unit having a main memory storing data and a microprogrammed control memory consisting of a plurality of read-only memory chips containing microprograms, provides for various variable field addressing, multi-way branching, push-down stack and byte string operations that share common instructions and hardware. Using the system, a contiguous set of bits may be accessed or stored in the main memory without regard to memory word boundaries, the number of bits in the set, or the location of the bits in a memory word. The variable field addressing features are based upon the use of two types of instruction words, viz., field addressing instructions and field descriptors, which extract the appropriate bits from main memory and process them according to the instructions specified. The system includes byte swapping circuitry such that during a single microinstruction subroutine execution cycle, portions of a fixed length data word in a register may be interchanged.

3 Claims, 19 Drawing Figures

FIG. 1

FIRST FIELD ADDRESSING INSTRUCTION | SECOND FIELD ADDRESSING INSTRUCTION

| 0 | 9 10 | 12 13 | 15 | 0 | 3 4 | 5 | 6 | 7 8 | 15 |
|---|---|---|---|---|---|---|---|---|---|
| 0 0 0 0 0 0 0 0 | 1 0 | RX | SX | OP CODE | R | I | X | S | DISPLACEMENT |

FIG. 2

FIRST FIELD DESCRIPTOR | SECOND FIELD DESCRIPTOR

| 0 | 15 | 0 | 3 4 | 7 8 | 15 |
|---|---|---|---|---|---|
| START OF FIELD ADDRESS | | BIT ADDRESS | FIELD LENGTH | COUNT | |

FIG. 3

EFFECTIVE ADDRESS COMPUTATION

| R I X S | EFFECTIVE ADDRESS |
|---|---|
| 0 0 0 0 | D |
| 0 0 0 1 | D + (B) |
| 0 0 1 0 | D + (X) |
| 0 0 1 1 | D + (B) + (X) |
| 0 1 0 0 | (D) |
| 0 1 0 1 | (D + (B)) |
| 0 1 1 0 | (D) + (X) |
| 0 1 1 1 | (D + (B)) + (X) |
| 1 0 0 | (P) + SD |
| 1 0 1 | (P) + SD + (X) |
| 1 1 0 | ((P) + SD) |
| 1 1 1 | ((P) + SD) + (X) |

FIG. 4

INCREMENTING OPTIONS

| SX FIELD | | FLAG |
|---|---|---|
| 0 0 0 | NO SELF INCREMENTING | |
| 0 0 1 | SELF INCREMENTING | Y2 |
| 1 1 1 | SELF DECREMENTING | Y3 |

FIG. 5

INDEXING OPTIONS

| R X FIELD | |
|---|---|
| 0 0 1 | NO REGISTER INDEXING |
| 0 1 0 | LINK REGISTER |
| 0 1 1 | TEMPORARY STORAGE REGISTER |
| 1 0 0 | INDEX REGISTER #1 (X) |
| 1 0 1 | INDEX REGISTER #2 (B) |
| 1 1 0 | EXTENDED ACCUMULATOR |
| 1 1 1 | ACCUMULATOR |

FIG. 6 FIELD ADDRESSING INSTRUCTIONS

| INSTRUCTION | OP CODE | MACHINE CODE | FLAG |
|---|---|---|---|
| LOAD LOGICAL FIELD | L L F | 1 0 0 0 | |
| LOAD ARITHMETIC FIELD | L A F | 1 0 0 1 | Y 1 |
| STORE FIELD | S T F | 1 0 1 0 | Y 0, Y 1 |
| STORE ZERO FIELD | S T Z | 1 0 1 1 | Y 0 |
| STORE ONES FIELD | S Ø F | 1 1 0 0 | Y 0 |
| COMPARE LOGICAL FIELD | C L F | 0 1 0 1 | |
| COMPARE ARITHMETIC FIELD | C A F | 1 1 0 1 | Y 1 |
| SENSE LEFT BIT OF FIELD | S L F | 1 1 1 1 | Y 1, Y 4 |

ST (STRAIGHT IN)
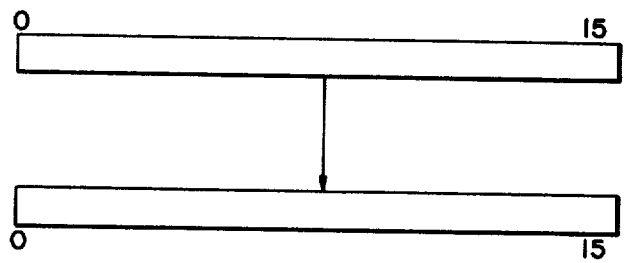
BS (BYTE SWAP)
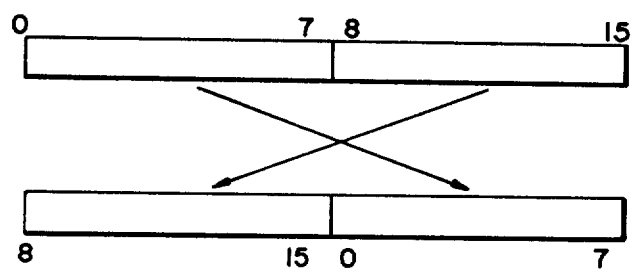
NS (NIBBLE SWAP)
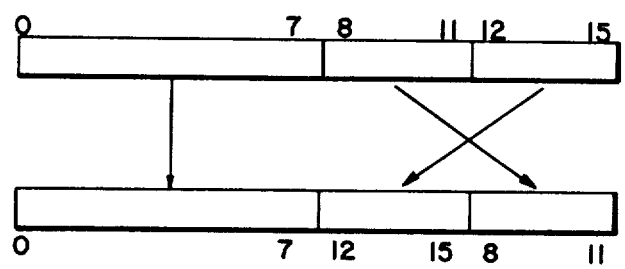
BN (BYTE NIBBLE SWAP)
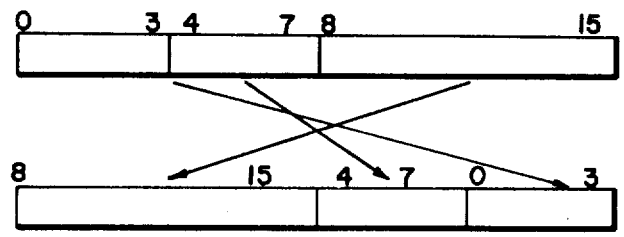
FIG. 8

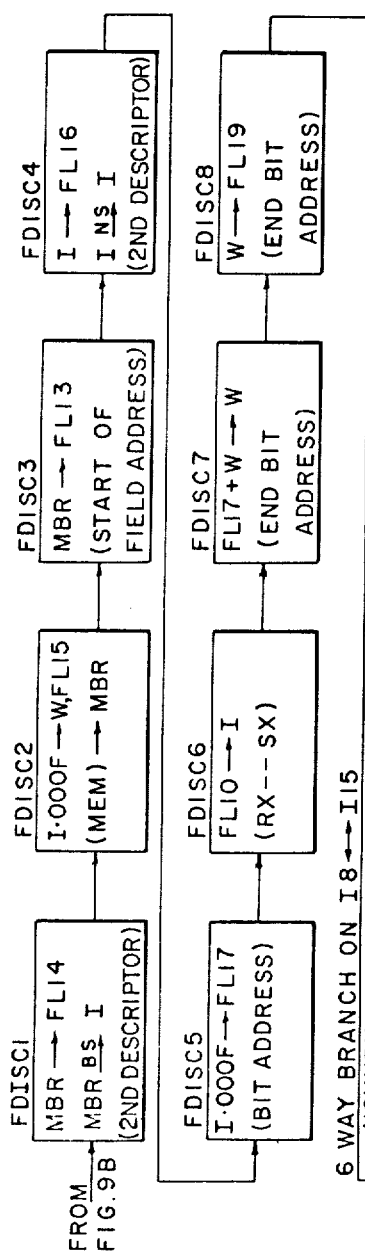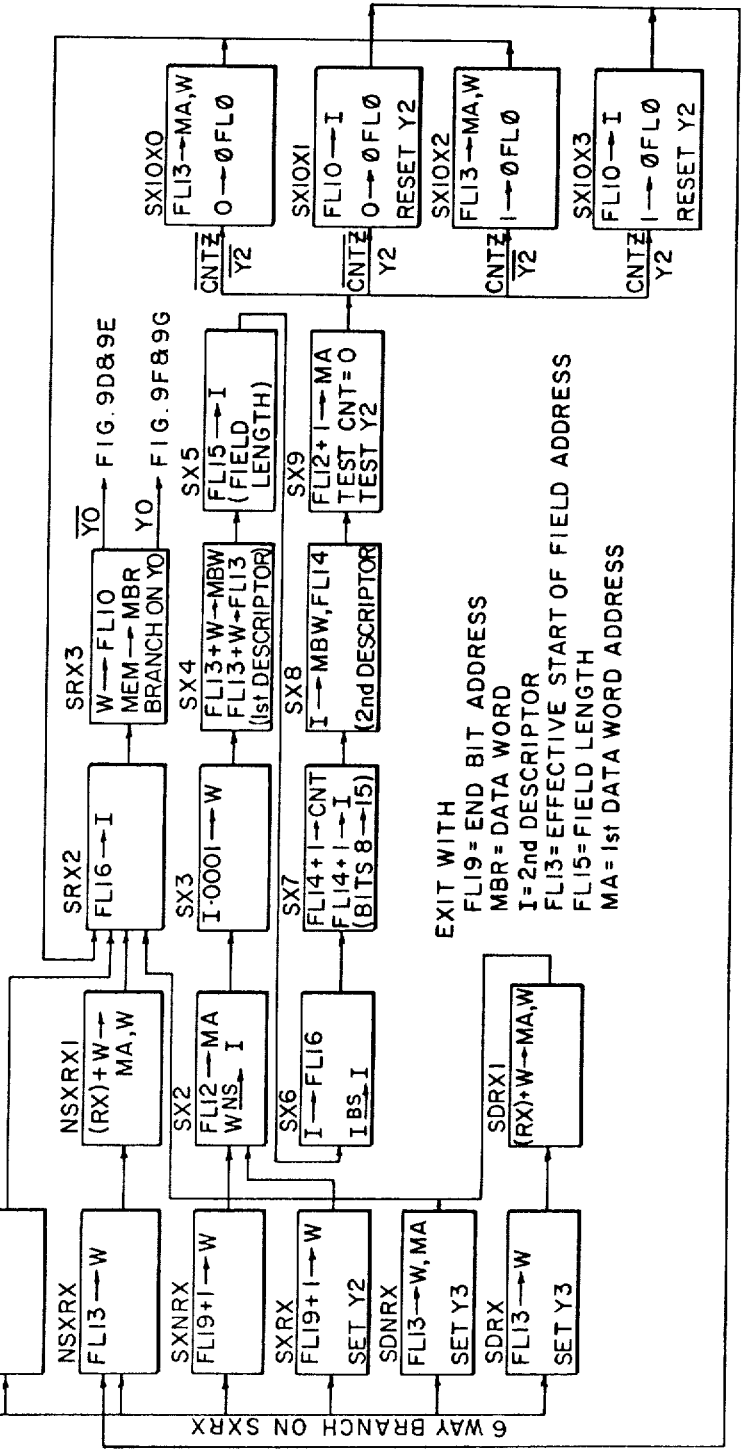
FIG. 9C

VARIABLE FIELD LENGTH ADDRESSING SYSTEM HAVING DATA BYTE INTERCHANGE

BACKGROUND OF THE INVENTION

This invention relates to data processing equipment and more particularly to circuits for efficiently specifying and operating upon data fields of any length without regard to the location of these fields within memory words and without regard to memory word boundaries. Appropriate use of this general capability enables a string and table manipulating capability, and a general push-down stack capability.

A recurring problem for the data processing system programmer is the requirement to operate on variable sized fields within words since a typical complement of peripheral devices will demand data of various word lengths and formats. In real-time process control systems the problem is compounded. First, the numerous hardware interfaces under direct control of the computer are typically designed for specific functions utilizing control words that optimize the performance of the hardware, rather than interface efficiently with the computer. These hardware control words are frequently of variable sizes and are broken up into subfields that are themselves variable. Second, a computer operating in real-time must handle these variable field operations in a minimum amount of time. These variable field operations are typically handled by software subroutines that extract the variable fields from the standard memory words, or by hardware interface units. Examples of such units are disclosed in DeSantis et al U.S. Pat. No. 3,680, 058 and Downing et al U.S. Pat. No. 3,430,202.

A related problem which occurs in all forms of programming but is of special importance to the real-time programmer is the problem of efficiently creating temporary storage for intermediate values while a program is being run, and storing these intermediate values as the CPU branches or is interrupted from one program to another. These intermediate values are commonly stored in a push-down stack. A push-down stack capability is commonly implemented from an area in main memory reserved for this purpose, a pointer pointing to the top or last word in the memory stack and some instructions in the vocabulary along with the necessary hardware to permit manipulation of the pointer and access to words in the stack.

SUMMARY OF THE INVENTION

The present invention provides a push-down stack capability and a variable field addressing capability in one unified system of software instructions and hardware, and thereby offers the system user a number of advantages that would not otherwise be available.

The integration of field addressing and push-down stack capabilities reduces the amount of hardware and the number of instructions required in that common instructions and hardware are shared by both capabilities. More specifically, in the proposed embodiment, these functions are implemented in the control memory of a microprogrammed central processing unit (CPU) which is made up of read-only memory (ROM) chips. Using this approach, costs are reduced since the ROM chips replace the hardware usually associated with variable field addressing and push-down stack functions. Furthermore, running time is reduced since a microprogram in the control memory, due to the shorter fetch time and more efficient coding, will run faster than an equivalent program in main memory.

The packing of data efficiently into main memory can easily be accomplished with this invention. For example, to pack a string of n bit elements into main memory, the programmer need only create a stack anywhere in memory specifying an n bit element length, and proceed to load into the stack without regard to main memory word boundaries. Of course, the same process will allow direct access to any element within this string.

Strings of elements, as would be created in the above process, may be efficiently operated upon by using an element counter as a loop termination control. A program can then be written which will operate on each element of the string, test the counter overflow indicator and terminate at the end of the string. It can be seen that byte string operations are a subset of this general capability.

This invention facilitates the creation of complex table structures that make efficient use of main memory and allow direct access to any element within those tables. This is true since the field addressing instructions work in conjunction with register indexing. Therefore, as an example, to test any n bits of all words in a table, a field addressing descriptor is set up to point to those n bits in the first word in the table and the index register is incremented through the number of words in the table. Thus, a program testing any set of bits in a table structure can be implemented.

The resultant programs can easily be checked for errors since the field descriptor words for an entire program may conveniently be kept in one specified part of that program, making it simpler to determine which part of main memory is being loaded into or accessed at any given time. This can be very useful in debugging inoperative programs and in guaranteeing the integrity of protected areas of main memory.

The resulting programs may be easily changed, and important consideration if enhancements to the original program become necessary at a later date. To move tables from one part of main memory to another, to change the length of elements being operated on, or to increase the number of elements per table, one need only change the appropriate bits in a field descriptor. The rest of the program remains unchanged. Thus, what would amount to a rewriting of an ordinary program would be a simple modification of the Field Descriptor words in this case.

BRIEF DESCRIPTION OF THE DRAWINGS

FIG. 1 shows the format of the Field Addressing Instructions.

FIG. 2 shows the format of the Field Descriptors.

FIG. 3 is a list of options that may be invoked to compute the effective address.

FIG. 4 is a list of incrementing options.

FIG. 5 is a list of indexing options.

FIG. 6 is a list of Field Addressing Instructions (Op Codes).

FIG. 8 shows the four data swapping options available when loading the I Register.

FIGS. 9A through 9K are flow charts of the Field Addressing microprogram.

DETAILED DESCRIPTION OF THE INVENTION

Figure 7:
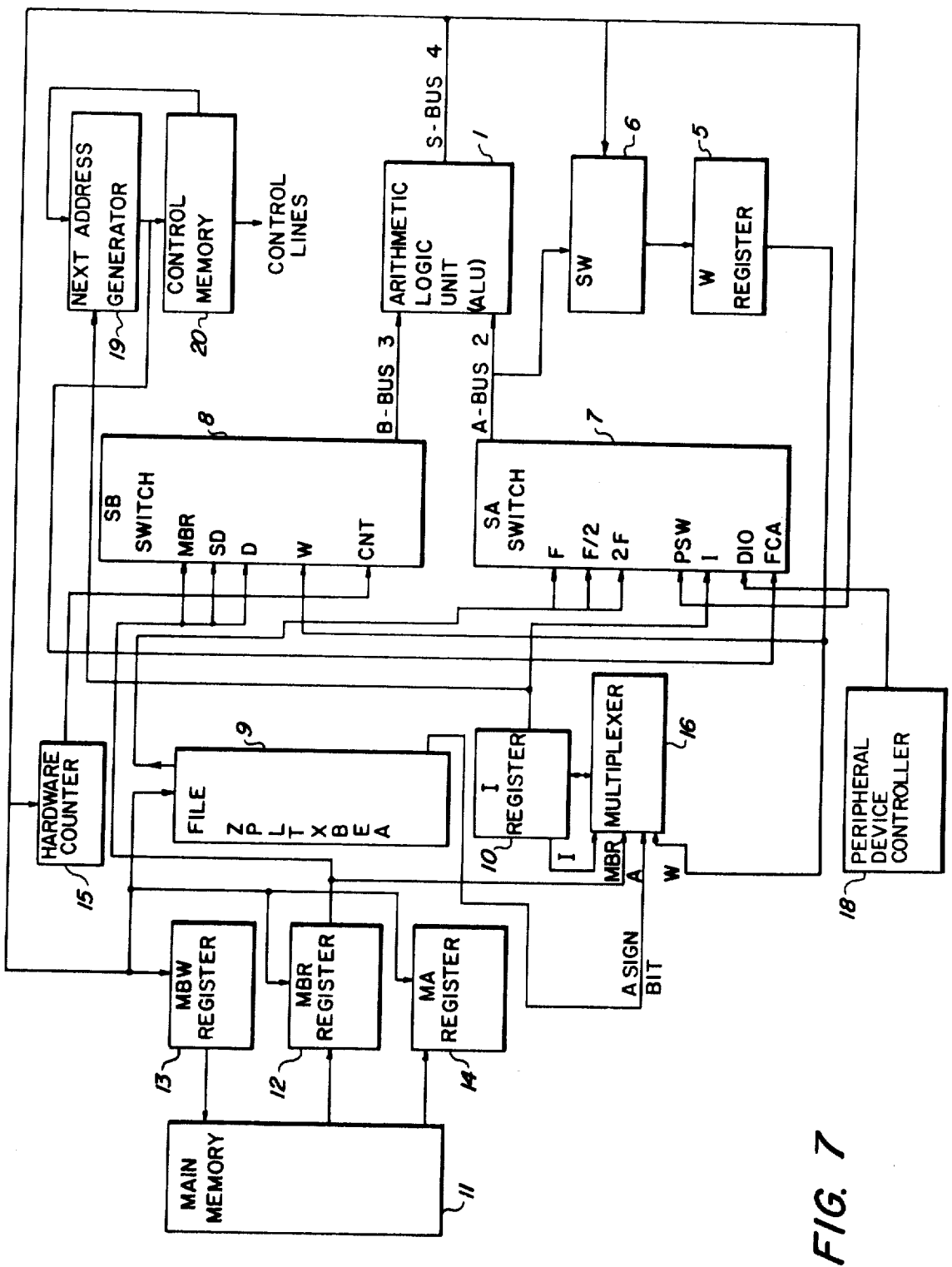
FIG. 7 is a block diagram of the central processing unit circuits.

Two types of instruction words provide the basis for this system of variable field addressing. The Field Addressing Instructions FIG. 1, specify the Operation Code, the incrementing and indexing mode, and point to the Field Descriptors. The Field Descriptors, FIG. 2, contain the address of that bit within that word in main memory at which this particular variable field starts and specify the number of fields and the number of bits per field in this particular string. A full set of indirect addressing and register indexing capabilities are provided so that control can be exercised over which, of many, Field Descriptors will be called upon by a Field Addressing Instruction, and also which, of many, indexing modes may be applied to the selected Field Descriptors. The resulting system provides considerable speed and flexibility in the handling of data tables arranged in unusual formats.

The Effective Address of a Field Addressing Instruction is the address of a Field Descriptor. The R, I, X, S and Displacement fields, are used to compute the effective address as shown in FIG. 3. If the R bit and the S bit are both zeros, the effective address is equal to the value in the Displacement (d) field of the instruction. If the R bit is a one, the effective address is the value of the program counter (P) plus the contents of the Displacement. If the I bit is a one, the effective address is treated as an indirect address; the effective address then is the value in the location whose address is equal to the Displacement. If the X bit is a one the effective address is equal to the value in Index Register #1 (X) plus the Displacement. This is referred to as "post indexing". If the S bit is a one the effective address is equal to the value of the Displacement plus the value in Index Register #2 (B). This is referred to as "pre-indexing". Pre-indexing is used where the effective address computation calls for indexing before honoring the indirect address; in post-indexing, the contents of the index register are added in after obtaining the indirect address. All possible combinations of effective address computation are shown in FIG. 3. SD refers to the Displacement with sign extension.

The format of the Field Descriptor words is in FIG. 2. In the preferred embodiment the First Field Descriptor word contains the address of the word in main memory containing the most significant bit of the variable field. The next four bits identify which bit within that memory word is the most significant bit of the field. Thus, in this embodiment any bit within any 16 bit word within a 64 K main memory may be specified as the start of a variable field. Bits 4 through 7 of the Second Field Descriptor specify the Field Length which in this embodiment has a 16 bit maximum. Bits 8 through 15 constitute an 8 bit Count Field which is used in conjunction with self-incrementing and self-decrementing to provide loop termination control when operating on a string of elements or to provide a "stack full" indication for push-down stack operation.

Just as the R, I, X and S fields are used in conjunction with the Displacement of the Field Addressing Instructions to determine the Effective Address, so also, the RX and SX fields of the First Field Addressing Instruction, and used to determine the Field Descriptor's effective Start of Field Address. These options are listed in FIGS. 4 and 5. If no self-indexing is specified (SX=000) and no register indexing is specified (RX=001) then the effective Start of Field Address is equal to the Start of Field Address in the Field Descriptor. If self-incrementing is specified (SX-001), the Bit Address in the Field Descriptor is incremented by the number of bits in the Field Length and the Count Field is incremented by one. If the Bit Address overflows, the Start of Field Address will be incremented by one to show that the first bit of the variable field is contained in the next word in memory. If overflow occurs when the Count Field is incremented, the overflow indicator will be set. Self-incrementing is useful as part of the inner loop in a program subroutine when operating sequentially on every element in a string of elements of identical size. If, prior to processing a string of elements of identical size, the Count Field contains a number equal to $2^8$ minus the number of elements in the string, then, when the string is processed using Field Addressing Instructions with self-incrementing, the overflow indicator will be set by the Field Addressing Instruction that processes the last element. In this case the Count Field can be used to provide program subroutine loop termination control by testing the overflow indicator.

Self-incrementing is also used for operating on push-down stacks. If a push-down stack consists of a sequential string of elements of identical size with the current top of stack element having an address larger than the address of the other elements within the stack, then self-incrementing is used for pushing a new element into the stack. If prior to a Field Addressing Instruction the Field Descriptor points to the current top-of-stack element, then a Store Field instruction with self-incrementing will push a new element into the stack and leave the Field Descriptors pointing to that new element as the current top-of-stack. In this case the Count field can be used to indicate that the stack is full. If the initial Descriptor which is set up when the push-down stack is empty contains a number in the Count Field equal to $2^8$ minus the maximum allowable size of the push-down stack, then the overflow indicator will be set following the Field Addressing Instruction that pushed a new element into the last available space in the stack.

After self-incrementing the contents of the register specified in the RX field, FIG. 5, is added to the Start of Field Address. However, the Field Descriptors in main memory are not modified as a result of register indexing. This is an important distinction between self-incrementing and register indexing. Register indexing is useful when operating on particular bits in a sequence of words. Thus, the Field Descriptors can be used to point to the particular bits of the first word and through the use of register indexing a subroutine may scan through a series of words in a table testing only those particular bits.

Register indexing can also be used to reference elements contained within a push-down stack provided that the elements within the push-down stack are all 16 bit words. A word that is known to be "n" words below the current top-of-stack word can be accessed by loading a register with a number equal to "−n". Then, a Field Addressing Instruction would be executed with a Field Descriptor which points to the current top-of-stack word and invokes register indexing using the register containing the value "−n".

Self-decrementing (SX=111) is essentially the converse operation to self-incrementing in that the Bit Address in the Field Descriptor is decremented by the number of bits in the field Length and the Count field is decremented by one. Also, overflows are handled in a similar manner. However, where self-incrementing modifies the Field Descriptor before the operation on the effective field is complete, self-decrementing is performed after the operation on the effective field is complete, and therefore only modifies the Field Descriptors in main memory and will influence subsequent operations but will not have any effect on the current operation. As is implied in the table in FIG. 4, self-incrementing and self-decrementing cannot both be invoked in the same Field Addressing Instruction.

All of the description presented thus far has been associated with the identification of the effective field. This section presents a brief description of the operation performed on the effective field by the various Field Addressing Instructions, shown in FIG. 6.

There are two load instructions, Load Logical Field and Load Arithmetic Field. Load Logical Field loads the effective field into the least significant end of the Accumulator and loads zeros into the remainder of the Accumulator. Load Arithmetic Field loads the effective field into the least significant end of the Accumulator and replaces the remainder of the bits in the Accumulator with the most significant bit of the effective field. The Load Arithmetic Field instruction assumes that the field is a signed quantity and, therefore, loading the remainder of the bits in the Accumulator with the most significant bit of the field is a sign extension.

There are three store instructions, Store Field, Store Zero Field, and Store Ones Field. Store Field replaces the effective field in memory by the n least significant bits of the Accumulator where n is equal to the number bits in the effective field. Store Zero Field replaces every bit of the effective field in main memory with zeros. Store Ones Field replaces every bit of the effective field in main memory with ones. For all store operations no other bits in main memory are modified except those bits which are part of the effective field.

There are two compare instructions, Compare Logical Field and Compare Arithmetic Field. Compare Logical Field assemblies a 16 bit word containing the effective field at the least significant end and zeros in all other bit positions, and then compares this word the contents of the Accumulator. The overflow and carry indicators are set or reset to indicate whether the Accumulator contents are greater, smaller or equal to this comparison word. Compare Arithmetic Field is the same as Compare Logical Field except that the 16 bit word to be compared with the contents of the Accumulator is formed by sign extension of the most significant bit of the effective field into all other bits of the word.

There in one sense instruction, Sense Left Bit of Field. This instruction loads the most significant bit of the effective field into the carry indicator. This is used to test the state of a particular bit in memory without altering the Accumulator.

The hardware necessary to implement these field addressing functions is shown in block diagram form in FIG. 7, and may be described generally as a CPU with a microprogrammed control memory. FIGS. 1 through 6 established the machine code for all Field Addressing Instructions and Field Descriptors. Instruction machine codes are hardware translated into Control Memory addresses and are used to call on the various field addressing microprograms contained in the Control Memory, all of which are located within one 256 by 60 bit page. These microprograms use the information in the Field Descriptors and Field Addressing Instructions to extract the appropriate bits from Main Memory and process them according to the Instructions specified.

The CPU in FIG. 7 is built around a 16 bit Arithmetic Logic Unit (ALU) 1 which performs all the required arithmetic or logic functions. The two input buses are the A Bus 2 and the B Bus 3 and the output is distributed throughout the CPU on the S Bus 4. Left and right shifts of data are normally accomplished in the W Register 5. The SW Register 6 controls the loading or unloading of the W Register onto the S Bus.

The SA Switch 7 is a multiplexer that determines what function is to be placed on the 16 bit A Bus. This SA Switch is implemented from Part No. 74151 devices which are described in the *Fairchild Semiconductor TTL Data Book* published in June, 1972. The relevant input functions are defined as follows: F is the output of the File 9. F/2 is the File output shifted one place to the right. This is used in conjunction with the hardware multiply. 2F is the output of the File shifted one place to the left. This is used in conjunction with the hardware divide. PSW is the program status word which contains the overflow and carry indicators. I is the output of the I Register 10. The DIO input is received on a set of data lines from a Peripheral Device Controller 11. The FCA input is the address of the current microcontrol word plus one. This is generally used for "branch and save" microsubroutine calls and stored as one of the words in the File.

The SB Switch 8 also implemented from Fairchild Part No. 74151 devices, is another multiplexer which determines what function is to be placed on the 16 bit B Bus 2 which is the other input to the ALU 1. MBR is the data input from Main Memory 11. SD is the lower byte of the MBR data with the sign of the byte (bit 8) spread through the upper byte. This is used for effective operand address calculation. D is the lower byte of the MBR data with 0's in the upper byte. This is also used for effective operand address calculations. The specific use of these 2 inputs is shown in FIG. 3. W is data from the W Register 5. CNT is the output of a 8 bit Hardware Counter 15 contained within the CPU.

The File 9 may be implemented from Fairchild Part No. 82521 bipolar random access memory chips and has a capacity of 32 16 bit words. The first 8 words have specific functions as follows: Z is a 0 source. P is the address of the current instruction in the Main Memory program. L is the link address. T is for temporary storage. X is index register number 1, used for post-indexing. B is index register number 2, used for pre-indexing. E is the extension of the Accumulator and A is the Accumulator. The remaining 24 locations may be used by the microprogrammer as working file locations and are referred to as File 1 through 24. The MBW Register 13 holds data that will be written into Main Memory. The MBR Register holds data that has been read from Main Memory. The MA Register 14 holds the address of that location in Main Memory that is currently being accessed.

The Control Memory 20, implemented from read-only-memory chips, contains the entire 60 bit by 256 word microprogram that defines the entire variable field addressing capability. The Next Address Generator 19 receives address information from the Control Memory and determines the next Control Memory address to be accessed either directly from the Control Memory inputs or by forcing a branch to an address determined by the data from the I Register 10.

The I Register 10 may be loaded through the I Multiplexer 16, which is implemented from Fairchild Part No. 74153 devices, from one of four sources, the I Register, the MBR Register, the S Bus, or the W Register. Data may be loaded into the I Register in any one of four ways, as shown in FIG. 8, resulting in a hardware configuration that can manipulate byte and hexadecimal data within a minimum amount of execution time. For instance, a byte swap could have been accomplished by a circular shift of 8 bits to the right, and interchanges of hexadecimal (hex) information could have been accomplished by a series of shifting and masking sequences. In this embodiment, however, hex and byte swaps are accomplished directly with a corresponding savings in computer time and programming effort.

The following discussion of the Control Memory program will explain how the hardware shown in FIG. 7 is used to accomplish the field addressing functions described above.

FIGS. 9A through 9I constitute a detailed flow chart of the entire Variable Field Addressing microprogram contained in the Control Memory. Each box represents one word in the program. Above each box is the symbolic location of that instruction and within each box is a symbolic representation of the data flow accomplished when the instruction is executed.

Figure 9A:
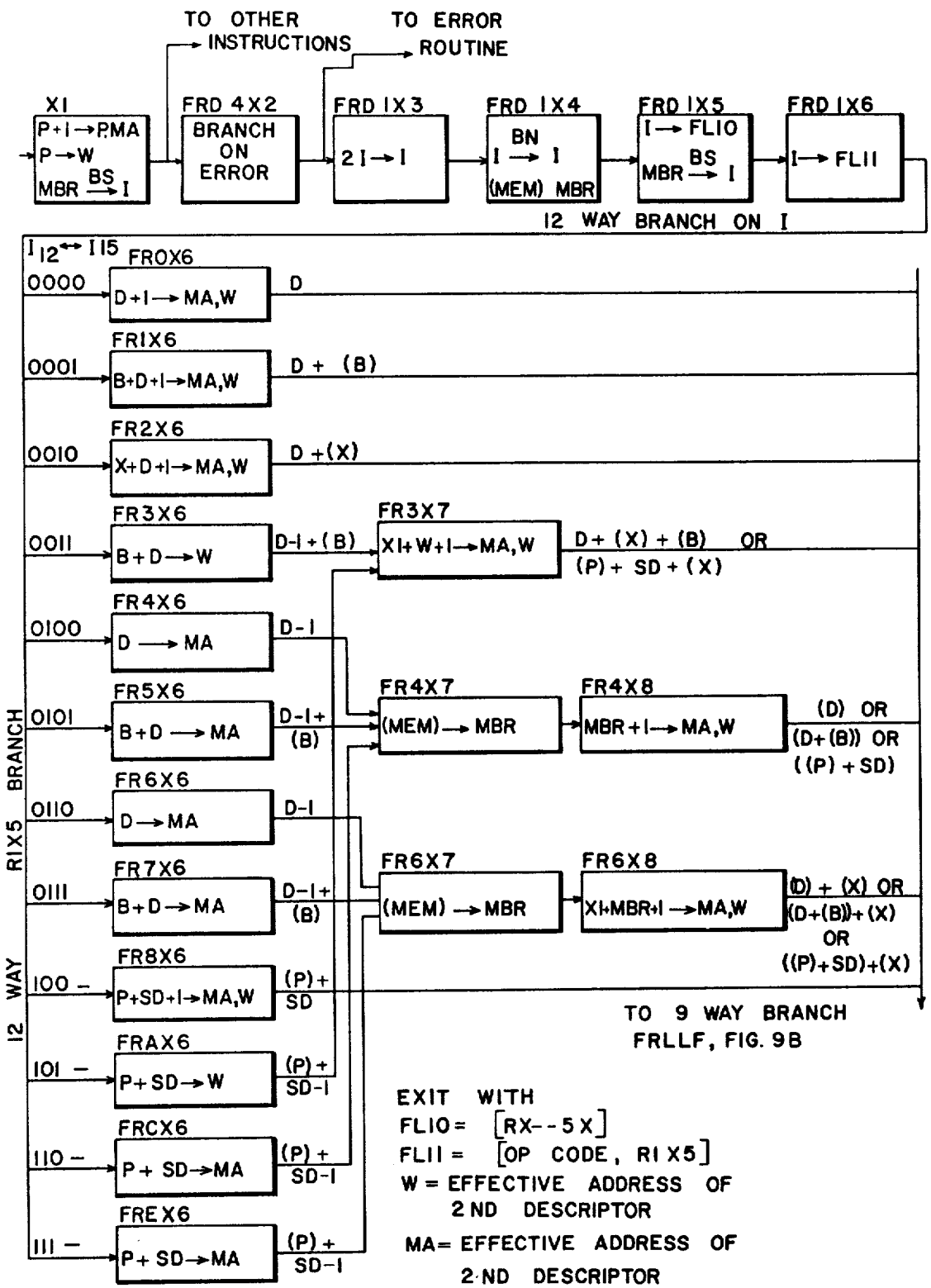

In FIG. 9A, location X1 is the basic starting point in the processing of all instructions. At this point the MBR Register contains the first half of the Field Addressing Instruction which will be byte swapped (see FIG. 8) into the I Register. Also, the program counter will be incremented by 1 and stored into the MA Register for use later in accessing the second half of the instruction word and also saved in the W Register for use later. At this point, a branch will be taken on the contents of the I Register. If bits 0 through 9 are as shown in FIG. 1, the program will branch to location FRD4X2. For instructions other than Field Addressing Instructions the program will branch elsewhere. At location FRD4X2, the SX and RX fields are tested for the presence of the Variable Field Addressing option, and if it is not implemented the program branches to an error routine. The next three instructions shift the RX and SX fields so that the RX field will be on an even hex boundary, and stores the result in file location 10 for later use. Finally, the contents of the MBR Register, the second half of the Field Addressing Instruction, is byte swapped into the I Register and is also stored away in file location 11. A 12 way branch is now taken on the contents of $I_{12}$ through $I_{15}$ which corresponds to the R, I, X and S fields.

The remainder of FIG. 9A is a flow chart of the process by which the effective address computation in FIG. 3 has been implemented. For example, if the RIXS field is 0000 the program will branch to FROX6 where the displacement plus 1 will be loaded into the MA Register. A 1 is added for the convenience of the microprogrammer in this case, since the second Field Descriptor word is more conveniently handled first. This address is also saved for later use in the W Register. If RIXS equal 0001 the program branches to FR1X6. A note on logic symbology is appropriate at this point. In FIG. 3, a letter B in parenthesis should be read "the contents of B". This is to indicate an indirect addressing function. Thus, on the second line of FIG. 3 the effective address is the displacement plus the contents of the B Register. It should be noted that this convention has been carried through FIG. 3 so that all effective address computations can be precisely stated but was not carried through the flow charts since the functional relationship should be clear from the context and the discussion. The instructions contained in locations FR5X6, 7 and 8 illustrate a double indirect address computation. In FR5X6 the contents of the B Register plus the displacement are loaded into the MA Register. In FR4X7 the word in memory is read out and used as the address that is finally loaded into the MA and W Registers in FR4X8. In this way, program control is passed to FIG. 9B of the flow chart with the effective address of the second Field Descriptor word in the MA and W Registers.

Figure 9B:
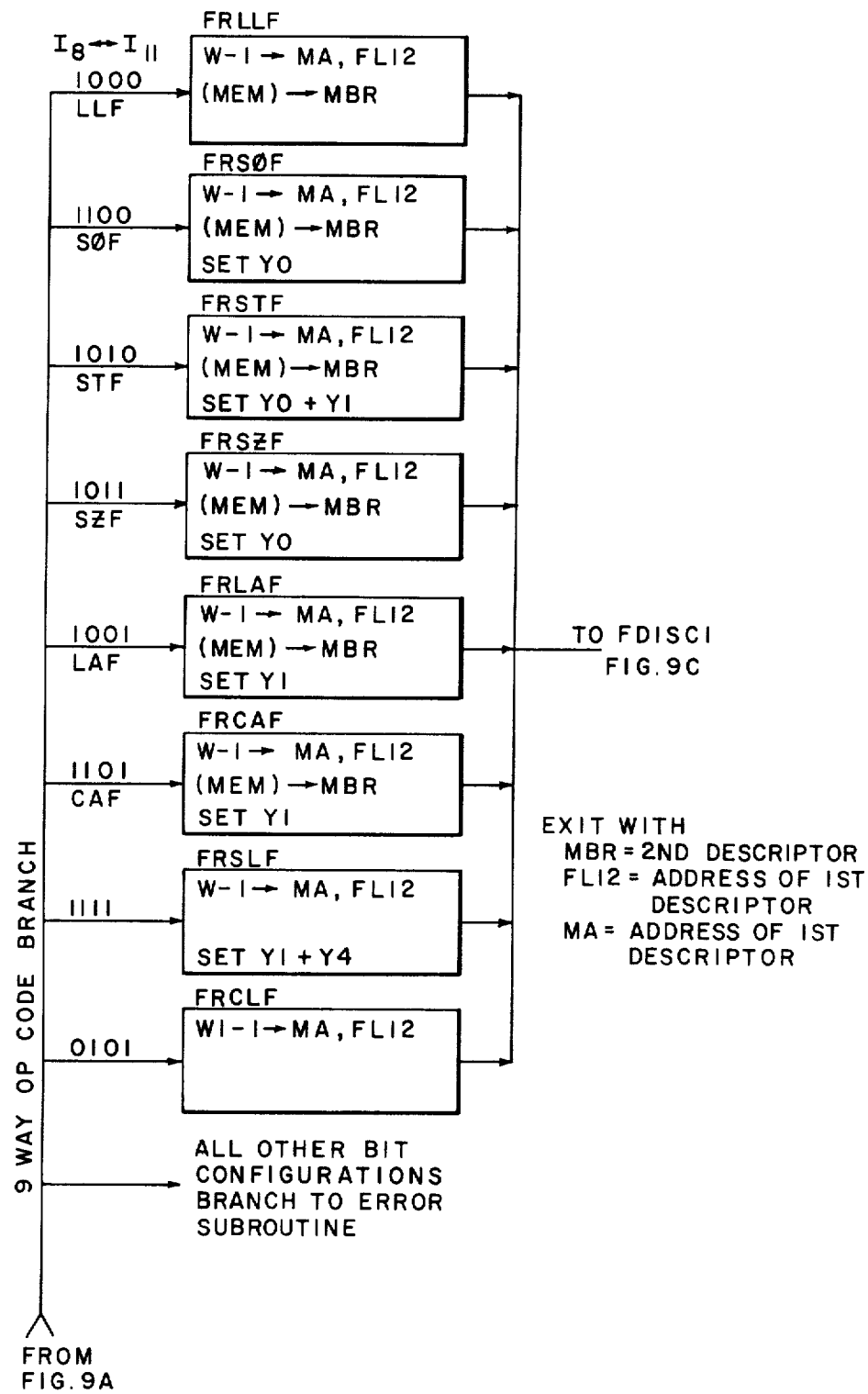

In FIG. 9B the program takes a nine way branch on bits 8 through 11 of the I Register which corresponds to the 4 Op Code bits. For each implemented Op Code, the address of the First Descriptor is put into the MA Register and stored away in File 12 for later use, and the Second Descriptor is transferred from Main Memory to the MBR Register. Also, the Y0, Y1 and Y4 flags are set appropriate to each Op Code as shown in FIG. 6. For unimplemented Op Code bit configurations, a branch is taken to the error subroutine.

The flow chart in FIG. 9C illustrates the implementation of the self-incrementing, self-decrementing and indexing options available to the programmer for modifying the Field Descriptor words at execution time. At FDISC1 the word contained in the MBR Register, the Second Field Descriptor word, is loaded temporarily into File 14 and also byte swapped into the I Register. At FDISC2 the Field Length portion of the I Register is loaded into the W Register and File 15 and the First Field Descriptor word is put into the MBR Register. At FDISC3 the contents of the MBR Register, the Start of Field Address, is loaded into File 13. The next three locations store the Second Field Descriptor word in File 16, mask and save the Bit Address in File 17 and load the RX and SX bits from File 10 into the I Register for later branching. FDISC7 and 8 compute the end bit address by adding the contents of File 17, the bit address, with the contents of W, the Field Length. This could result in a number from 0 to 30.

With the preliminary bit manipulation accomplished, a six way branch is now taken on $I_8$ through $I_{15}$ which represents the six SX and RX options. If no option is specified, the program enters NXSNRX where File 13, the previous effective Start of Field Address, is loaded directly into the MA and W Registers to be used for the next effective Start of Field Address. In other words, the Start of Field Address has not been modified.

If an indexing option has been specified, the program enters through location NSXRX where the contents of File 13, the effective Start of Field Address, is added to the contents of the specified index and that result is used to load the MA and W Registers. If self-decrementing and index registering are required the program enters SDRX where the contents of the index register specified plus the effective Start of Field Address are used to calculate the new effective Start of Field Address. This is identical to the situation where no incrementing option is used since self-decrementing is not accomplished until after data access. Similarily, if only self-decrementing is requested, the program enters through SDNRX where the effective Start of Field Address is loaded directly into the W and MA Registers. In all the above cases, the program proceeds through SRX2 and 3 which prepares the program to branch both of the Y0 flag and the contents of File 16, the second Field Descriptor. The two SD modes set a Y3 flag to enable -self-decrementing later in the program.

Where the self-incrementing option is requested, the program enters at SXNRX where the contents of File 19, the end bit address, is increased by one to be stored in the W Register. This quantity is increased by one since it is an addition of the Field Length and the Bit Address where the Field Length is defined as one less than the number of bits in the field. The self-incrementing and indexing option forces a branch into SXRX where a similar end bit address computation is done. In addition, a Y2 flag is set so that these two options may be distinguished later in the program. At SX2 the contents of File 12, the Start of Field Address in the first Field Descriptor word, is loaded into the MA Register. If there is no indexing this will remain as the effective Start of Field Address. Also, W is nibble swapped into the I Register. If in the preceding steps, the bit count plus the Field Length plus one equals a number larger than 15, then the overflow after this nibble swap will be located in the least significant bit of the I Register. This is masked out at SX3, loaded into W, and added to the effective Start of Field Address at SX4. The result is that if self-incrementing by a word large enough to cross a boundary has been accomplished, then File 13 will be incremented by one to indicate a new effective Start of Field Address.

At location SX5 through SX8 the second Field Descriptor is assembled. The Count is incremented by one, loaded into the I Register along with the Field Length contained in File 15 and the result including the new bit address which was loaded into I in SX2, is loaded into the MBW Register for transfer to Main Memory. At SX9 the contents of File 12, which at this point contains the address of the first Field Descriptor plus one is loaded into the MA Register so that the second Field Descriptor just assembled will be loaded into the proper location in Main Memory. At this point, a four way branch is taken on the Y2 flag and the count. The Y2 flag will be set if the SXRX option has been requested. At this point in the program, self-incrementing has been completed and the program will now loop back to the initial six way branch to service the RX portion of the instruction. Before looping back, the Y2 flag is reset so that the SX option will not be serviced again, and the I Register is restored to its original contents so that another six way branch may be taken. If no indexing is required the MA and W Registers are loaded from File 13 which is the modified Start of Field Address. Finally, if the Count has gone to zero, the overflow indicator will be set for use later in the program.

Figure 9D:
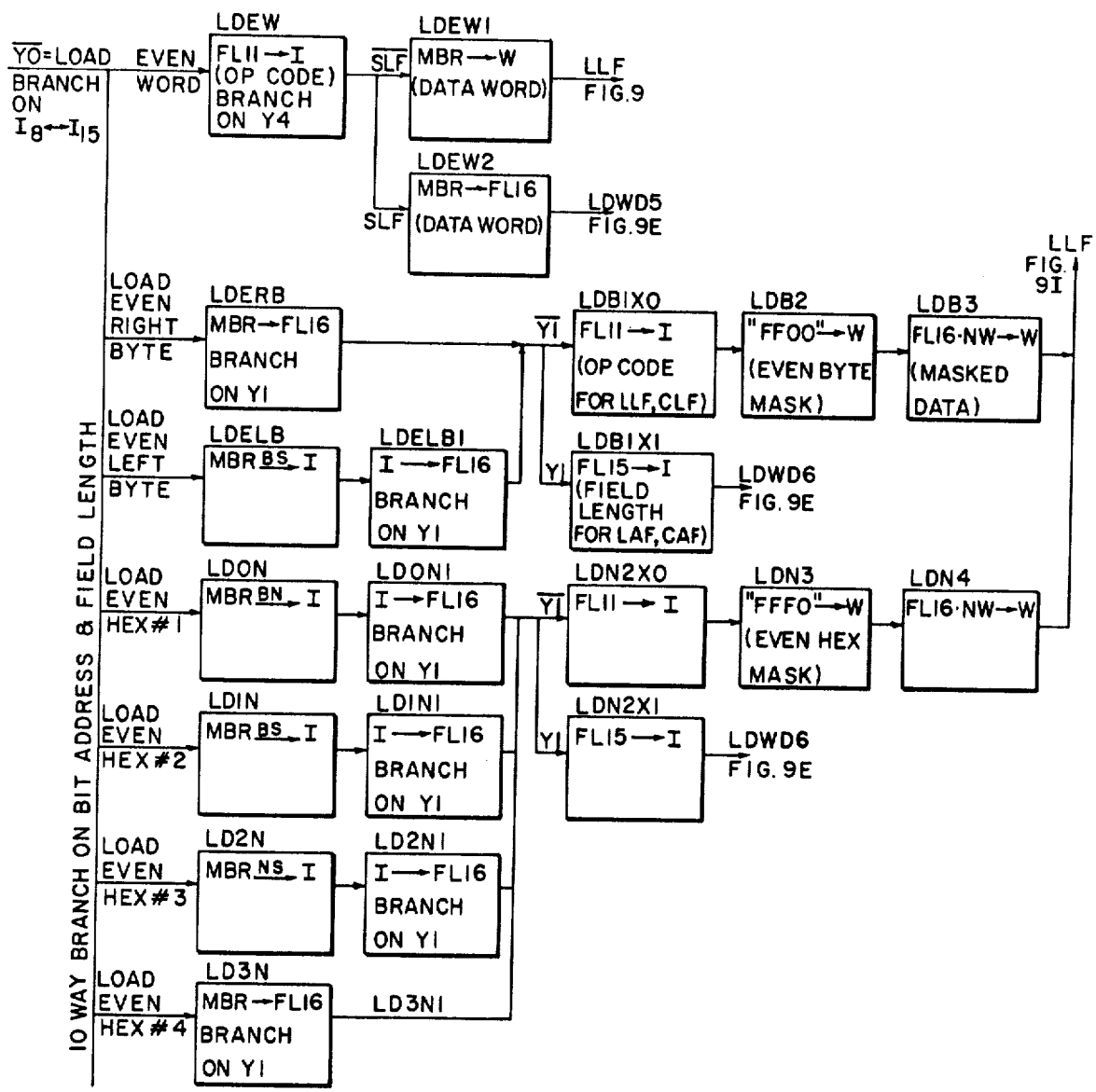

If the Y0 flag is reset, indicting a Load instruction, the program will branch to FIG. 9D. At this point, the I Register contains the second Field Descriptor word and a 10 way branch will be taken on the Bit Address and Field Length. In general, the programs flowcharted in FIGS. 9D and 9E access a word in memory, right justify the bits requested by the instruction, mask out the remaining bits, and supply appropriate sign information. These functions could have been implemented in one general purpose subroutine. Instead, separate program loops were written for the processing of even words, even bytes even hexidecimals, odd fields and single bits. This has been done since the packing, unpacking and manipulation of byte, hex and BCD information is very common in programming and considerable overhead in the form of machine running time can be saved by writing specific programs for each case.

The above terms are defined as follows; an even word is 16 bits starting at bit 0, an even byte is 8 bits starting at bit 0 or 8, an even hexidecimal is 4 bits starting at bit 0, 4, 8 or 12, a single bit is one bit in any position and an odd field is none of the above. In all cases, the program will branch out of these subroutines with the appropriate data contained in the W Register, masked, and right justified, and the Op Code will be contained in the I Register.

For even word processing, there is no masking or justifying necessary. Therefore, the program will branch to LDEW, LDEW1 and LDEW2 where the Op Code is directly loaded into the I Register and the data is loaded into the W Register. In the special case of a Sense Left Bit of Field instruction the Y4 flag will be set. This option will be discussed later in connection with FIG. 9E.

For loading an even right byte the program branches to LDERB where the data is loaded directly into File 16. Since the data is already right justified, no further manipulations are necessary. For loading even left bytes, the data is first byte swapped into the I Register, to right justify the byte of interest and then loaded into File 16. In either case the program branches on Y1 which differentiates between the logical loads and the arithmetic loads. For logical loads the program branches to LDB1XO where the Op Code is loaded into the I Register. At LDB2 and LDB3 the data is masked and loaded into the W Register to complete the function. In case of arithmetic loads there is a further requirement to generate appropriate extended signs. In this case the program branches through LDB1X1 where File 15, the Field Length, is loaded into the I Register. The remaining parts of this subroutine will be discussed in connection with FIG. 9E. The four even hex loops are similar to the even byte routines in that the data is right justified and loaded into File 16, a branch taken on the Y1 flag, and the data is masked as before.

Figure 9E:
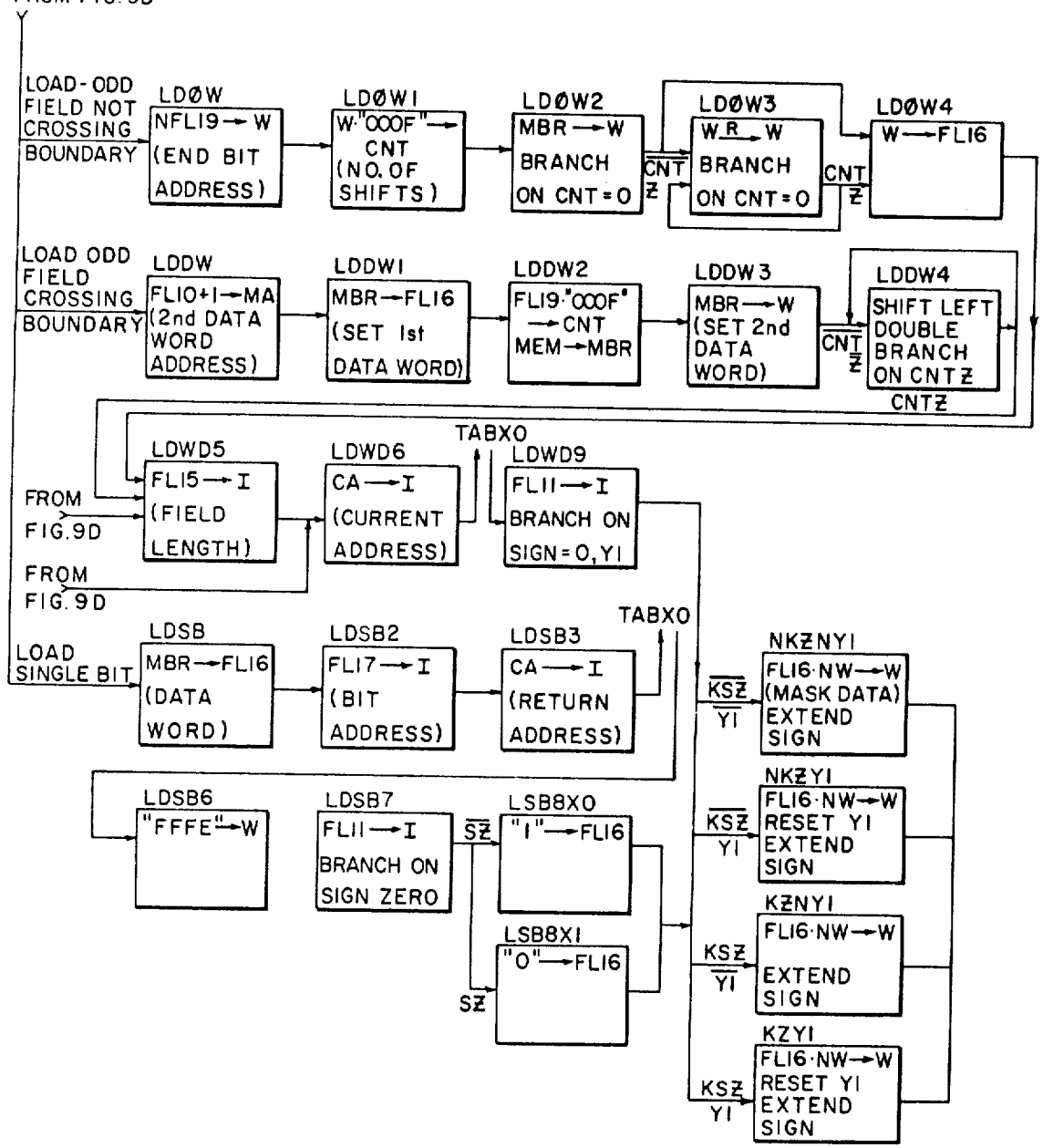

The flow chart in FIG. 9E represents the program required to load an odd field not crossing a memory boundary, load an odd field crossing a memory boundary, process arithmetic loads, rocess Sense Left Bit of Field instructions and load a single bit. To load an odd field not crossing a memory boundary, the program starts at LDOW where the one's complement of the end bit address is loaded into the Hardware Counter. The data word is now brought into the W Register and shifted right until the Counter goes to zero. At this point, the data is right justified and loaded into File 16. Next, the Field Length is loaded into the I Register and the program branches to a table of subroutines that identify the sign and provide a mask. The first four sets of subroutines are shown in FIG. 9K. The field length, a number from zero through F in hexidecimal notation will determine a branch to one of the subroutines. Since the field length in I is always one less than the actual field length, a two bit field will appear as a 0001 in I and will generate a branch to TABX4. Here, in FIG. 9K, the most significant bit of the data word is masked into the sign bit register at TABX4 and a mask for the two bits of right justified data is loaded into the W Register. The program now returns to LDWD9 in FIG. 9E where the Op Code is loaded into I. The program then branches on the sign bit as determined in FIG. 9K and on the Y1 flag which specifies an arithmetic field. In the two cases where the Y1 flag was set, it will be reset, and in all cases the sign determined at the FIG. 9K subroutine will be extended left through the masked data positions of the word to form an extended sign.

The loading of a field that crosses a memory boundary differs from the program above in that two words must be accessed from memory to implement this 1 instruction. At LDDW the first data word address is incremented by one and loaded into the MA Register. It will be remembered from FIG. 9C that the MA Register previously contained the address of the first data word and the MBR Register contained the data work itself. Thus, the first data word will be transferred to File 16 upon execution of instruction LDDW1 and the second data word will be accessed at LDDW3. The end bit address is loaded into the shift counter and a series of double left shifts involving the W Register and File 16 are taken such that when the Counter goes to zero the appropriate data will be right justified in the W Register.

For a Sense Left Bit of Field instruction for an even word, there is no requirement to right justify the data word. The information is in the sign bit and this data can be produced directly by branching to the appropriate masking subroutine. Therefore, File 16 is loaded with the data work at LDEW2 in FIG. 9D and branches directly to LDWD5 in FIG. 9E where the appropriate sign subroutine is called. This sign bit will be used in conjunction with the Y4 flag to produce the appropriate function later in the program.

In the case of an Arithmetic Load instruction the sign bit of the variable field will be extended throughout the remaining bits of the word to the left of the variable field portion. Therefore, instead of simply masking out the unneeded bits, the program branches directly from LDB1X1 or LDN2X1 in FIG. 9D to LDWD6 in FIG. 9E. Thus, when there is a sign extension later in the program at NKZNY1 etc., there will be a sign of either one or zero instead of the automatic zero in the case of a Load Logical Field.

By definition, the data word is the sign bit in the case of the single bit load type instruction. Therefore, instead of right justifying data all that is needed in this case is to identify the sign and spread it through the entire word, which is done as follows. At LDSB the data word is loaded into File 16 which will be used in the mask and sign subroutine, FIG. 9K, to determine the sign of the data. At LBSB2 the one's complement of the bit address is loaded into the I Register to provide branch information upon reaching the mask and sign routine. Finally, at LDSB3 the return address is stored into the I Register and the program branches on the previous contents of the I Register. Upon returning, the one bit mask is loaded into W, the Op Code is loaded into the I Register and the data which is either a one or a zero is loaded into File 16.

Thus, in all cases it can be seen that upon completion of this portion of the program File 16 contains the right justified data, W contains the right justified and masked data, and I contains the Op Code.

Figure 9F:
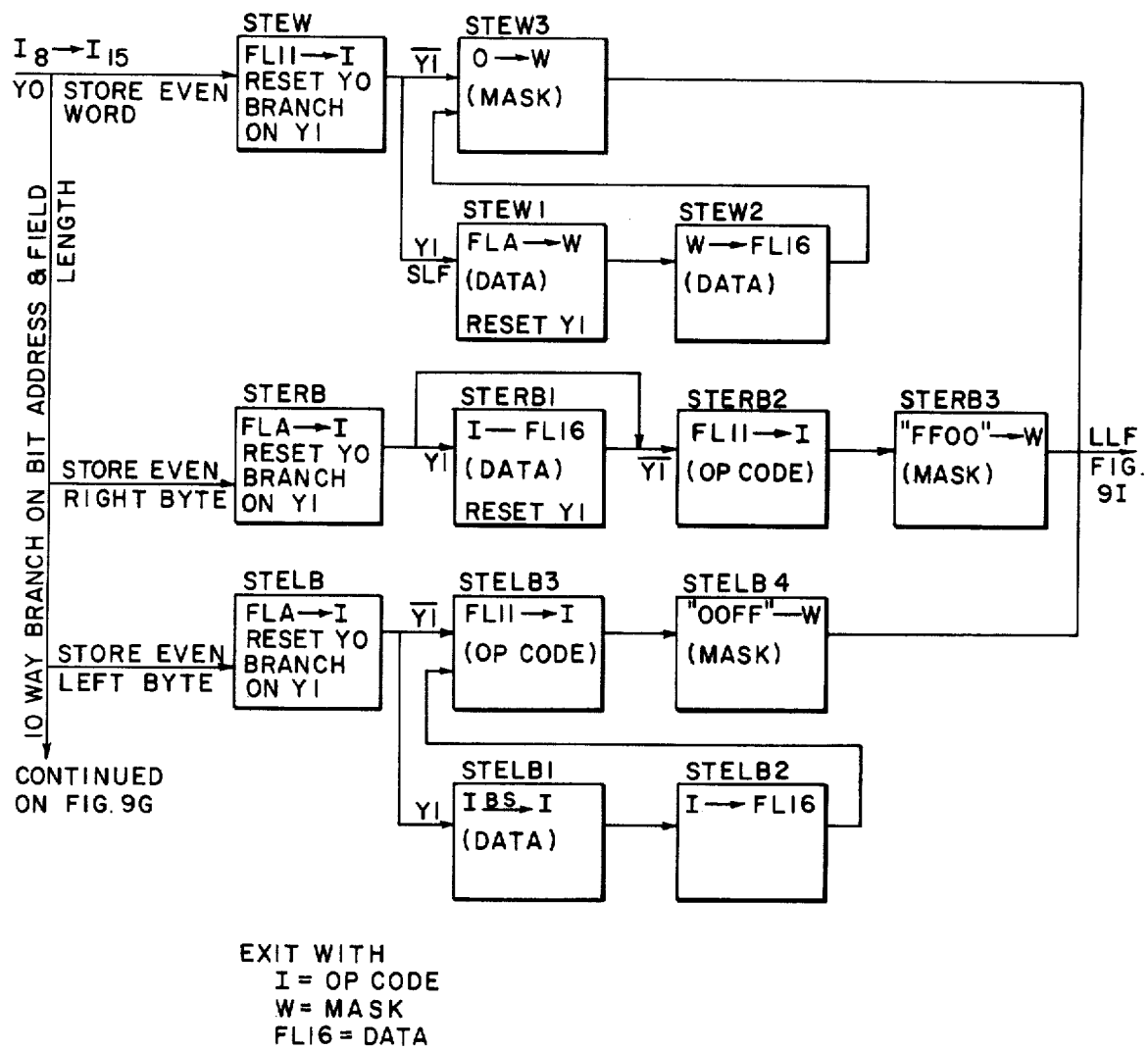
Figure 9G:
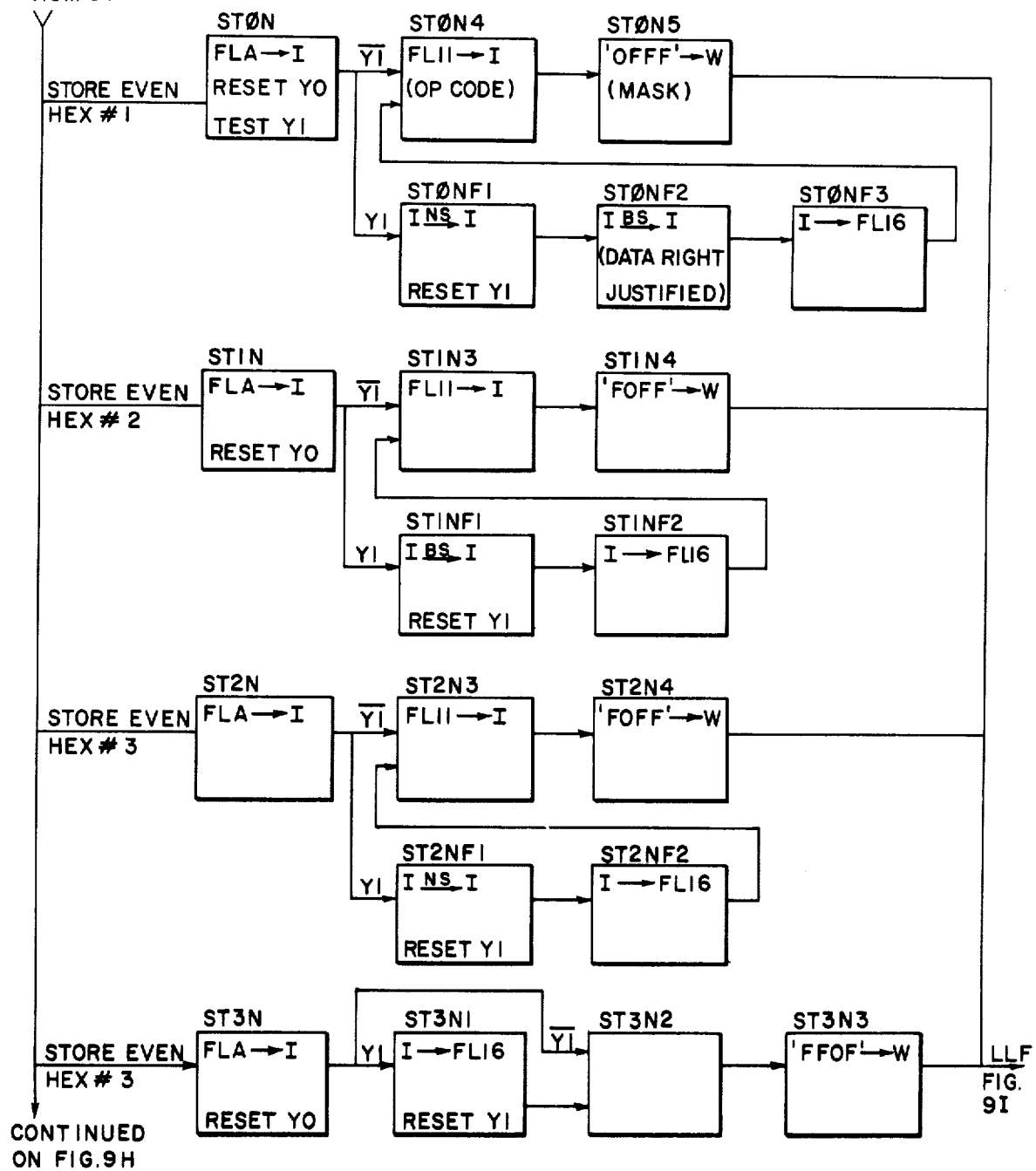
Figure 9H:
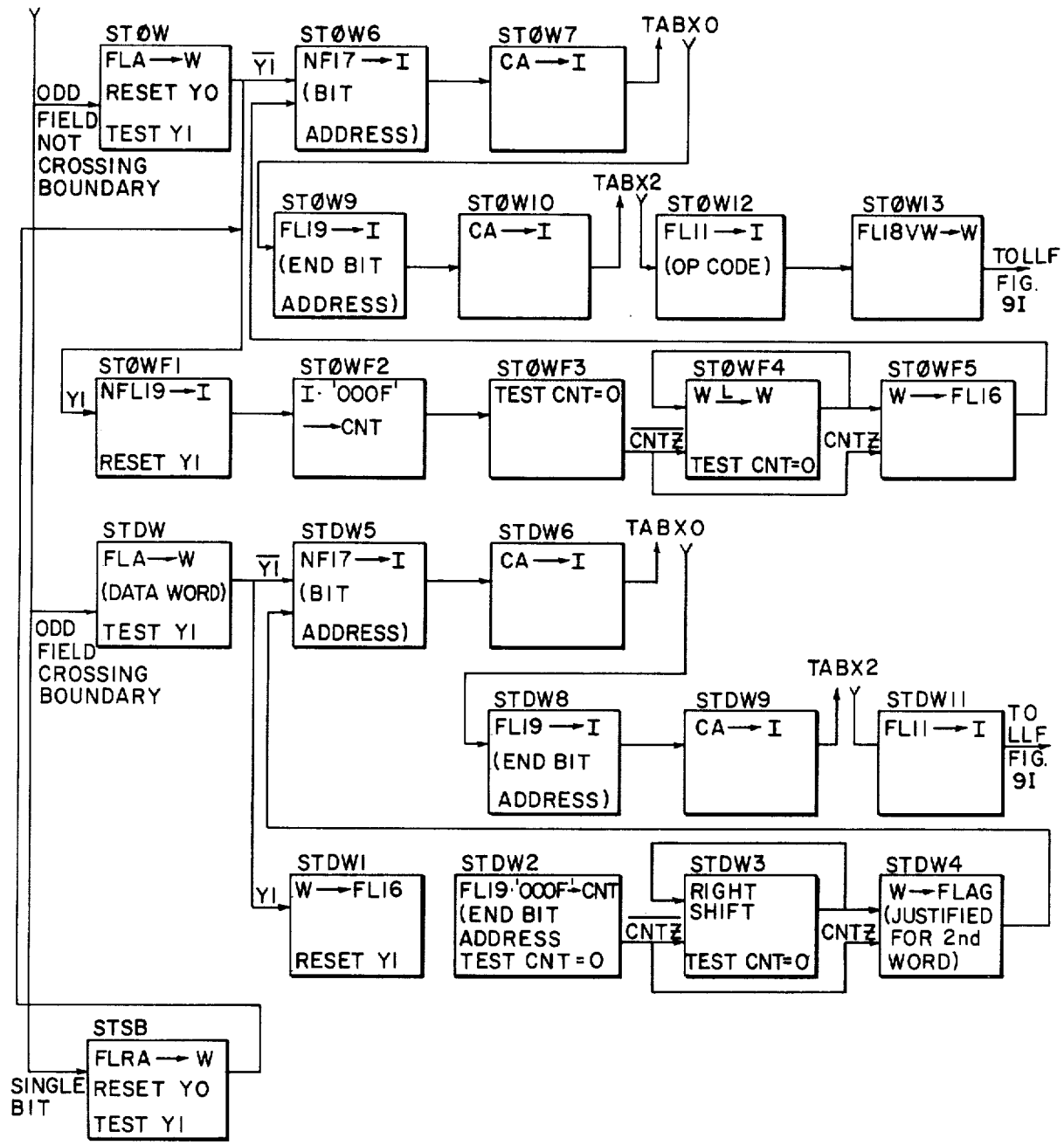

The store instruction program is likewise broken up into even word, even byte, even hexidecimal, odd field and single bit loops, the flow charts of which are contained in FIGS. 9F, 9G, and 9H. In all cases the data which is right justified in the Accumulator is shifted to its appropriate position and loaded into File 16, the mask is loaded into W, and the Op Code is loaded into I before exiting this part of the program. For even word stores the program is entered at STEW where the Op Code is loaded into the I Register. At this point a branch is taken on the Y1 flag. If Y1 is reset the instructions must be either a Store Zero Field or a Store One's Field. In either case no data is involved. A zero mask is stored in W and the program branches out. If Y1 is set, the instruction is a Store Field instruction. Here data must be taken from the Accumulator and stored into File 16 before resuming the Store Even Word loop. For Store Even Right Byte the program enters at STERB. Here the data word is loaded into the I Register from the Accumulator and a branch on Y1 is taken. For the Store Field instruction the data is loaded into File 16. Otherwise File 16 is not disturbed. In either case the Op Code is loaded into I, the appropriate mask is loaded into W and the program branches out. Store even left byte is similar to store even right byte except that at STELB1 the data in I is byte swapped into itself to left justify the right byte.

FIG. 9G contains the flow charts corresponding to the store hex loops. In all cases, the data is loaded from the Accumulator and swapped into the appropriate hex. In all other respects these flow charts are similar to the even byte flow charts. FIG. 9H contains the flow charts for the odd field and single bit options. For the case of an odd field not crossing a memory boundary the program enters at STOW.

Data from the accumulator is loaded into W and in the case of the Store One's or Zeros Field instructions, the one's complement of the bit address is used to enter the mask and sign subroutine. Upon return, the end bit address is loaded into I and used to call the left mask subroutine. The left mask is OR'ed together with the right mask in W at location STOW13 and the program exits to FIG. 9I from this point. In the case of a Store Field instruction, the branch from STOW is taken to STOWF1. In this case the end bit address is loaded into the shift counter and is used to shift the W data left to its appropriate position. The program now resumes as before from location STOW6. In the case of a store across a memory boundary the program is entered at STDW where the Accumulator data is loaded into W. For a Store Zero Field or Store Ones Field instruction, the program continues at STDW5 where a branch to the mask subroutine will result in a right mask being loaded into W. At STDW8 the end bit address is used to call the left mask subroutine resulting in a left mask being loaded into File 18. Finally, the Op Code is loaded into I prior to a branch to LLF in FIG. 9I. For the condition where a Store Field instruction has been requested, the program will branch to STDW1 where the data word will be loaded into File 16 and the end bit address loaded into the Hardware Counter. The data is then double right shifted through File 16 and W until the data is placed appropriately in W and File 16. The data in W is then stored in File 8 and the program resumes at STDW5. Finally, the single bit loop at STSB is identical to the case of a store of an odd field not crossing a boundary and therefore immediately branches into that part of the program.

Figure 9I:
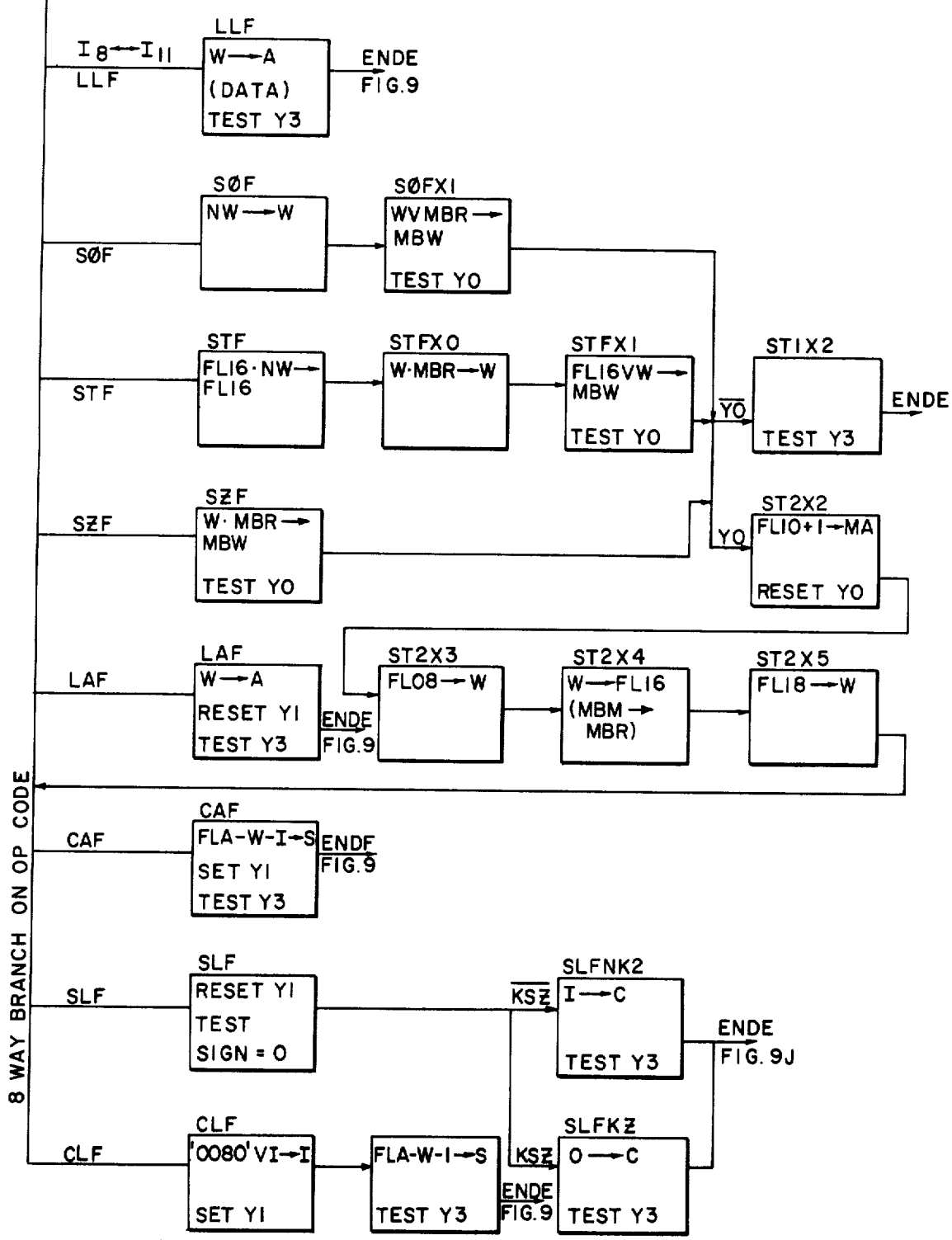

The program now enters the flow chart shown on FIG. 9I and immediately takes an 8 way branch on the Op Code contained in I. For a Load Logical Field instruction the data word in W which is already properly masked and right justified is loaded into the Accumulator. The Load Arithmetic Field instruction is handled identically. For the Store One's Field instruction the program enters at location SOF where the one's complement of the mask is OR'ed with the contents of the MBR Register and loaded into the MBW Register for storage in Main Memory. For the Store Field function the unwanted bits are masked out of the data work at STF, the mask is loaded into W at STFX0 and the data is OR'ed to the mask at STFX1. Store Zero Field at SZF is similar to Store One's Field except that the mask is not one's complemented. In the above three cases a test is now made on Y0. It will be noticed from FIGS. 9F, 9G, and 9H, that Y0 is reset in all cases except where a word must be stored in Main Memory across a word boundary. In such a case, two storage operations are necessary. Returning to FIG. 9I, where Y0 is reset, one storage operation is sufficient and the program branches to ST1X2. However, if Y0 is set the program will branch to ST2X2 for implementation of the second storage operation. First, Y0 is reset to prevent another passage through this part of the program. Also, the contents of File 10 plus 1, which is the location of the next word in Main Memory, is loaded into the MA Register. At ST2X3 the contents of File 8, the least significant portion of the Accumulator data, justified for a second storage, is loaded into W and from there into File 16. Finally, File 18, the right mask, is loaded into W. Now conditions are set for a second loop through the 8 way branch since I still contains the Op Code, W contains a mask and File 16 contains the new set of data. If a Compare Arithmetic Field instruction is being processed, the program enters location CAF with mask data plus sign, right justified, in W. This quantity subtracted from the Accumulator minus one is computed and the sign of the results is used by the comparative logic. Compare Logical Field is identical to Compare Arithmetic Field except that I must be modified (for hardware implementation reasons) to appear to be a compare Logical field. For Sense Left Bit of Field the sign of I is tested and the carry indicator is set or reset.

Figure 9J:
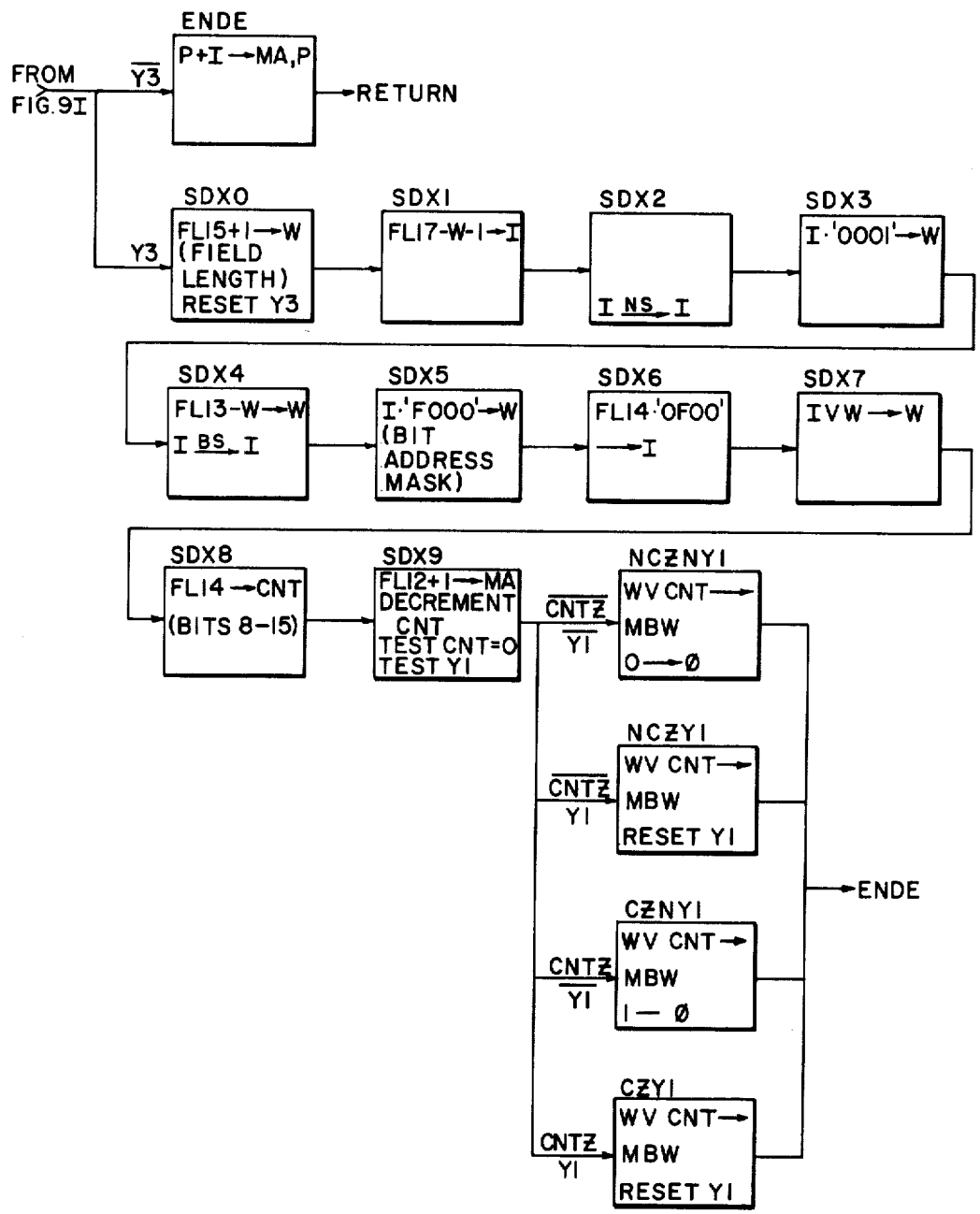
Figure 9K:
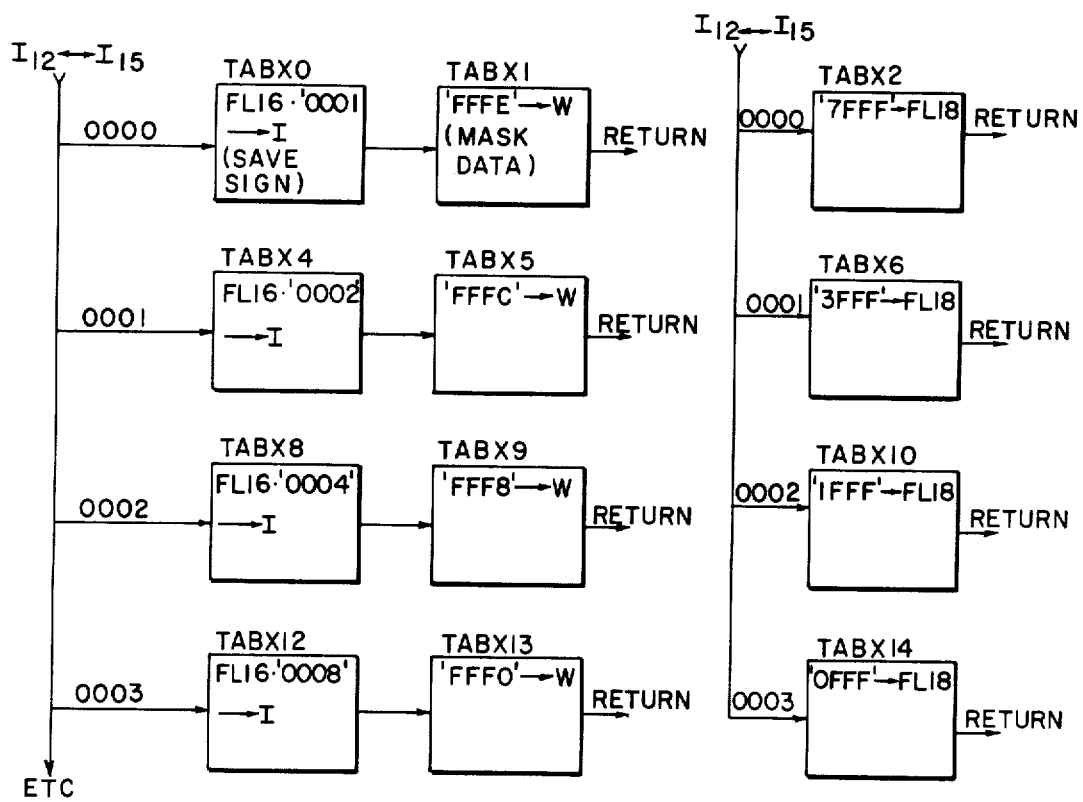

In all cases, the program branches to location ENDE in FIG. 9J where a branch on the Y3 flag is taken. If Y3 is reset no self-decrementing is necessary, the program counter and the MA Register are incremented and the Variable Field Addressing portion of the program is completed. If the Y3 flag is set, self-decrementing must be accomplished. First the Y3 flag is reset to prevent the program from entering this loop again. Also, File 15, the field length plug one, is loaded into W. This is because the program is coded such that the field length carried in the computer is one less than the actual field length. At SDX1 a new Bit Address is computed by subtractiing that quantity from the old Bit Address. This results in the proper Bit Address after self-decrementing. At SDX2 the contents of I are nibble swapped to put an overflow, if any, into the least significant bit which is then masked into W. Also, the address of the First Descriptor is loaded into the MA Register in preparation for the loading of a new Start of Field Address into that location. At SDX4 the Start of Field Address is decremented by one if required and I is byte swapped into itself to put the Bit Address into bits 0 through 3 of I. The rest of I is then masked out at SDX5. The original field length, which never changes, is masked into bits 4 through 7 of I, and at SDX7, these previous two quantities are OR'ed together. At SDX8 and 9 the Count Field is loaded into the Hardware Counter and decremented by one. Also, the address of the Second Descriptor is computed and put into the MA Register. Now a branch is taken on the previous (SDX8) contents of the Hardware Counter and the Y1 flag. In all cases the contents of W which contains the Bit Address and the Field Length is OR'ed to the Hardware Counter which contains the new Count. Finally, the overflow counter is either set or reset and the Y1 flag is reset to enable implementation of logic in subsequent programs. Having finished the self-decrement function the program branches to location ENDE and the Varible Field Address portion of this microprogram is completed.

In the foregoing there has been disclosed methods and operation for implementing a variable field addressing capbility for use in a data processing system containing a microprogrammable central processing unit. While a specific embodiment was discussed in conjunction with this capability, such an embodiment is exemplary only as other instructions, formats and apparatus could be utilized to perform the disclosed function. For instance, other instruction sets, other circuit implementations and other methods of indexing and incrementing could be used to implement the disclosed functions.

The invention is not limited to the embodiment described above, but all changes and modifications thereof not constituting departures from the spirit and scope of the invention are intended to be covered by the following claims.

What is claimed is:

1. In a microprogrammable digital computer including main memory means for storing fixed length instruction and data words in storage locations having fixed boundaries corresponding to the length of said fixed length instruction and data words, a varible field length addressing system comprising:
   arithmetic logic unit means for performing logic operations on said fixed length data words,
   register means coupled to said arithmetic logic unit means for storing said fixed length data words prior to, during, and after logic operations upon said fixed length data words by said arithmetic logic unit means, and coupled to said main memory means for transferring said fixed length instruction and data words therebetween,
   control memory means responsive to said fixed length instruction words stored in said register means for branching to a corresponding plurality of microinstruction subroutines stored internally in said control memory means to accomplish an instruction's requested variable field length addressing function, for executing said microinstruction subroutines, and for executing said branching to any one of a plurality of microinstruction subroutines in one execution cycle, said control memory means being coupled to said register means and said arithmetic logic unit means to control performance of said variable field length addressing function, said control memory means comprising:
   a microinstruction subroutine for determining the type, number and sequence of operations to be performed by said arithmetic logic unit means and said register means to enable implementation of the variable field length addressing function,
   next address generator means responsive to said microinstruction subroutine and to the state of said register means for determining the location of the next microinstruction to be executed, and for executing it,
   control line means responsive to said microinstruction subroutine and coupled to said register means and said arithmetic logic unit means for carrying signals that force said arithmetic logic unit means and said register means to perform those operations determined by said microinstruction subroutine, and said register means includes swapping circuit means for interchanging portions of a fixed length data word stored in said register means during a single microinstruction subroutine execution cycle.

2. A system as set forth in claim 1 wherein said main memory means has stored therein:

branch instructions allowing variable field length addressing instructions to be executed repetitively, count instructions to determine the number of repetitions, and to determine the location of a variable field length based on said number, compare instructions to test at execution time the magnitude of said number compared to a predetermined limit, and instructions to terminate said repetition when said limit is reached.

3. A system as set forth in claim 1 wherein said fixed length instruction words comprise index instructions for determining the address of the fixed length data word in which the current variable field is located.

* * * * *